United States Patent
Schwarz et al.

(10) Patent No.: US 10,731,661 B2
(45) Date of Patent: Aug. 4, 2020

(54) GAS TURBINE ENGINE WITH SHORT INLET AND BLADE REMOVAL FEATURE

(71) Applicant: United Technologies Corporation, Farmington, CT (US)

(72) Inventors: Frederick M. Schwarz, Glastonbury, CT (US); David A. Welch, Quaker Hill, CT (US)

(73) Assignee: Raytheon Technologies Corporation, Farmington, CT (US)

(*) Notice: Subject to any disclaimer, the term of this patent is extended or adjusted under 35 U.S.C. 154(b) by 685 days.

(21) Appl. No.: 14/974,138

(22) Filed: Dec. 18, 2015

(65) Prior Publication Data

US 2017/0175767 A1    Jun. 22, 2017

(51) Int. Cl.

| | |
|---|---|
| *F04D 29/52* | (2006.01) |
| *F02C 7/04* | (2006.01) |
| *F02C 7/36* | (2006.01) |
| *F04D 29/32* | (2006.01) |
| *F04D 29/64* | (2006.01) |
| *F02C 3/04* | (2006.01) |
| *F02K 3/06* | (2006.01) |
| *F04D 19/00* | (2006.01) |

(Continued)

(52) U.S. Cl.
CPC .............. *F04D 29/526* (2013.01); *F02C 3/04* (2013.01); *F02C 7/04* (2013.01); *F02C 7/36* (2013.01); *F02K 3/06* (2013.01); *F04D 19/002* (2013.01); *F04D 25/028* (2013.01); *F04D 29/321* (2013.01); *F04D 29/644* (2013.01); *F04D 29/663* (2013.01); *F05D 2220/32* (2013.01); *F05D 2220/36* (2013.01); *F05D 2230/70* (2013.01); *F05D 2250/283* (2013.01); *F05D 2260/30* (2013.01); *F05D 2260/96* (2013.01)

(58) Field of Classification Search
CPC .......... F04D 29/526; F01D 11/08; F01D 5/20; F01D 11/127
See application file for complete search history.

(56) References Cited

U.S. PATENT DOCUMENTS

| | | | | |
|---|---|---|---|---|
| 4,734,007 A | * | 3/1988 | Perry ................... | F01D 5/3023 415/173.1 |
| 5,403,148 A | * | 4/1995 | Forrester .............. | F01D 21/045 415/200 |

(Continued)

FOREIGN PATENT DOCUMENTS

| | | |
|---|---|---|
| EP | 2628919 A2 | 8/2013 |
| WO | 2014137471 A1 | 9/2014 |
| WO | 2014137685 A1 | 9/2014 |

OTHER PUBLICATIONS

European Search Report for European Application No. 16204885.4 dated May 8, 2017.

*Primary Examiner* — Ted Kim

(74) *Attorney, Agent, or Firm* — Carlson, Gaskey & Olds, P.C.

(57) ABSTRACT

A gas turbine engine comprises a fan rotor having fan blades received within an outer nacelle, and the outer nacelle having an inner surface. At least a portion of the nacelle inner surface extends radially inwardly to be radially inward of an outer diameter of the fan blades. The inner surface of the nacelle is formed with a trench, which extends into the inner surface to a radially outer extent that is spaced radially outward of the outer diameter of the fan blades.

6 Claims, 3 Drawing Sheets

(51) Int. Cl.
*F04D 25/02* (2006.01)
*F04D 29/66* (2006.01)

(56) References Cited

U.S. PATENT DOCUMENTS

| | | | | |
|---|---|---|---|---|
| 5,707,206 | A * | 1/1998 | Goto | F01D 11/10 |
| | | | | 415/173.1 |
| 6,375,410 | B2 * | 4/2002 | Clouse | F01D 21/045 |
| | | | | 415/200 |
| 6,669,446 | B2 | 12/2003 | Hodgkins, Jr. | |
| 6,736,601 | B2 | 5/2004 | Nielsen et al. | |
| 7,402,022 | B2 * | 7/2008 | Harper | F01D 21/045 |
| | | | | 415/214.1 |
| 8,075,270 | B2 | 12/2011 | Violette et al. | |
| 8,231,345 | B2 | 7/2012 | Robinson | |
| 2011/0305576 | A1 * | 12/2011 | Ward | F01D 5/3007 |
| | | | | 416/220 R |
| 2012/0076635 | A1 * | 3/2012 | Atassi | B64D 33/02 |
| | | | | 415/1 |
| 2013/0216364 | A1 * | 8/2013 | Evans | F02C 7/04 |
| | | | | 415/182.1 |
| 2014/0083079 | A1 | 3/2014 | Kupratis | |
| 2014/0294581 | A1 * | 10/2014 | Rivers | F01D 25/24 |
| | | | | 415/214.1 |
| 2015/0044028 | A1 * | 2/2015 | Lord | F02K 3/068 |
| | | | | 415/115 |
| 2015/0226231 | A1 * | 8/2015 | Murdock | F04D 29/403 |
| | | | | 60/726 |
| 2016/0169048 | A1 * | 6/2016 | Grainger | F01D 25/28 |
| | | | | 415/213.1 |

* cited by examiner

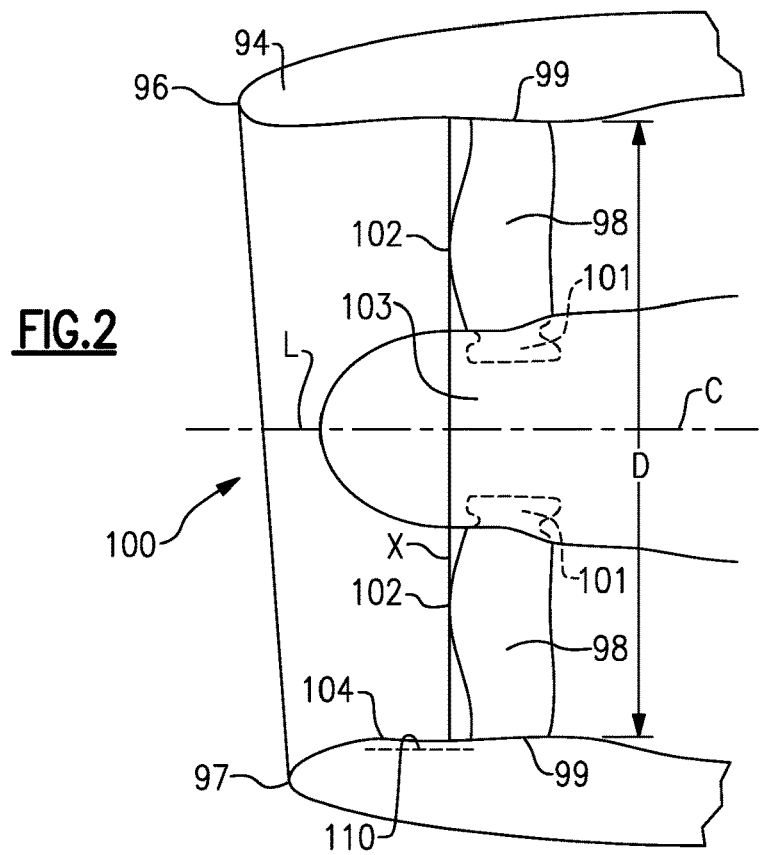
FIG.2
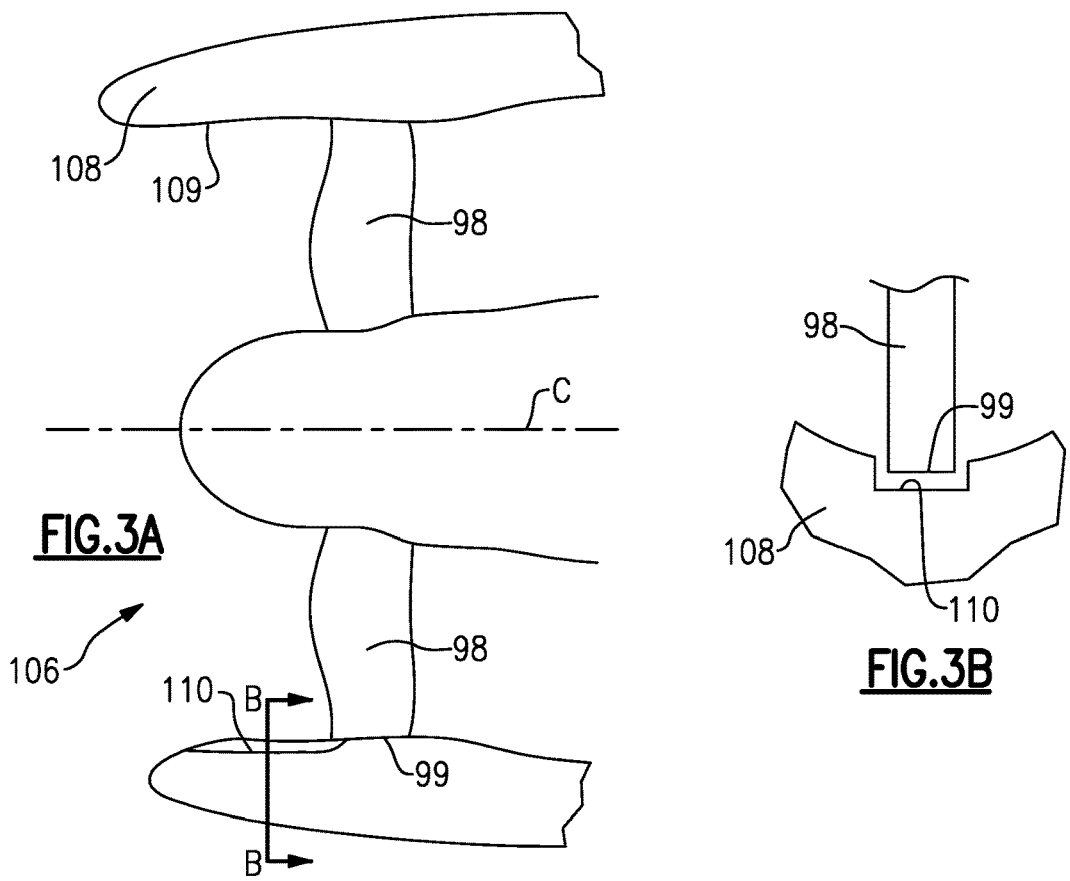
FIG.3A
FIG.3B

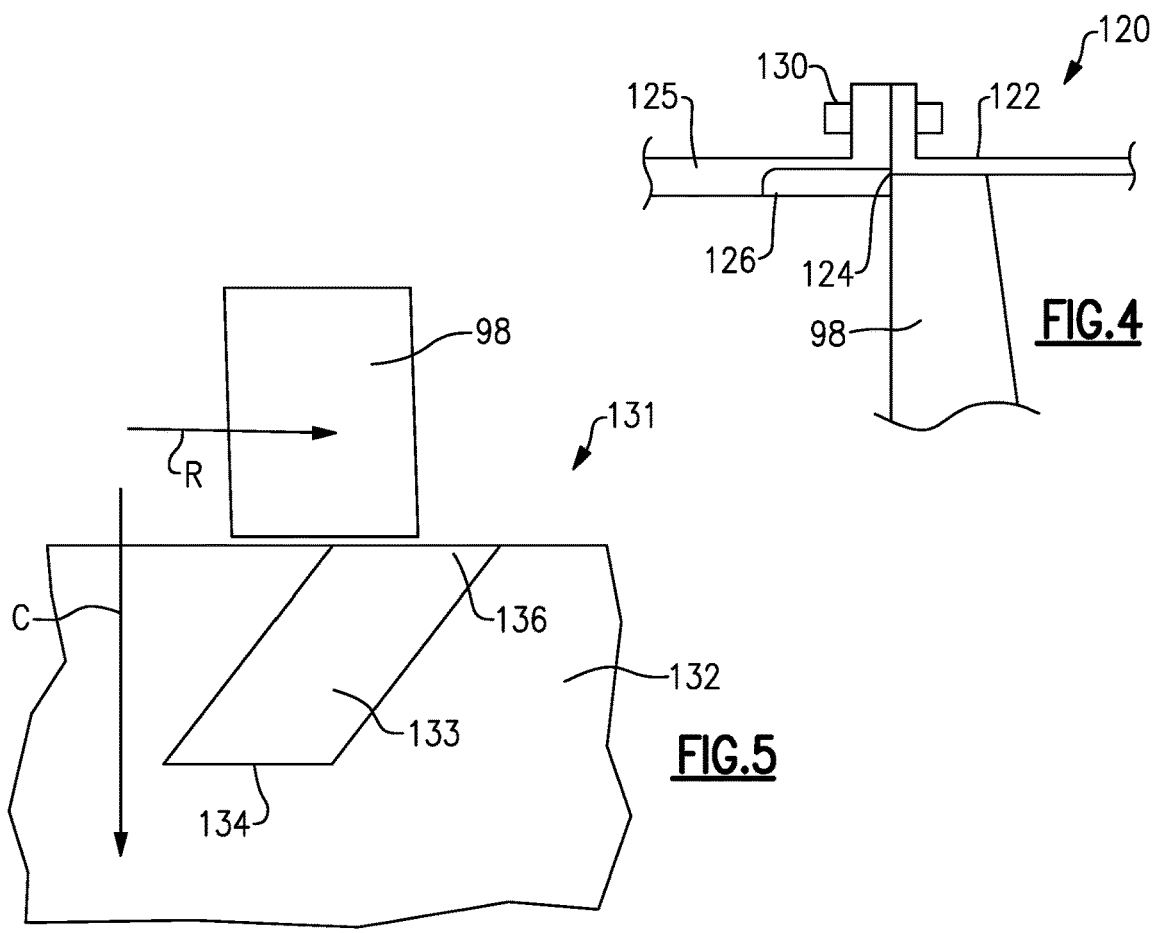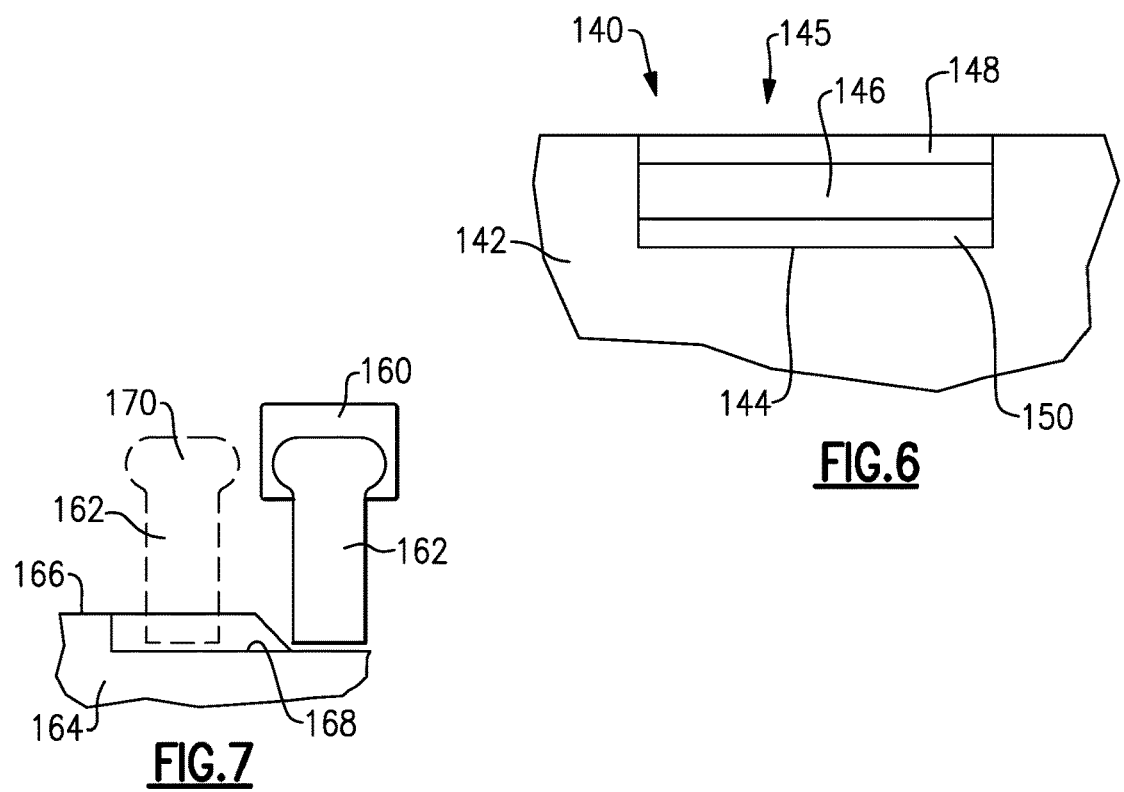

000
GAS TURBINE ENGINE WITH SHORT INLET AND BLADE REMOVAL FEATURE

BACKGROUND OF THE INVENTION

This application relates to a gas turbine engine having a fan blade removal feature.

Gas turbine engines are known and typically include a fan delivering air into a bypass duct as propulsion air and into a compressor as core flow. The air is compressed in the compressor and delivered into a combustor where it is mixed with fuel and ignited. Products of this combustion pass downstream over turbine rotors, driving them to rotate.

Recently, a gear reduction has been incorporated between a fan drive turbine and the fan rotor. This has increased the design freedom for the gas turbine engine designer. In particular, the fan can now be made to rotate slower than the turbine. With this change, the diameter of the fan has increased.

It has recently been proposed to provide a gas turbine engine, where the inlet or area of a surrounding housing or nacelle forward of the fan rotor, is shorter than in the past. Providing a shorter inlet reduces the weight of the engine and also reduces external drag. Other benefits include reducing a bending moment and corresponding load on an engine structure during flight conditions such as takeoff. Further, by making the inlet shorter, the overall envelope of the engine is reduced. However, the shorter inlets raise various challenges including a need to have design freedom along the inner periphery of the inlet.

SUMMARY OF THE INVENTION

In a featured embodiment, a gas turbine engine comprises a fan rotor having fan blades received within an outer nacelle, and the outer nacelle having an inner surface. At least a portion of the nacelle inner surface extends radially inwardly to be radially inward of an outer diameter of the fan blades. The inner surface of the nacelle is formed with a trench, which extends into the inner surface to a radially outer extent that is spaced radially outward of the outer diameter of the fan blades.

In another embodiment according to the previous embodiment, a distance is defined from a plane defined by leading edges of the fan blades to an axial location of a forwardmost part of the nacelle, and an outer diameter of the fan blades being defined, and a ratio of the distance to the outer diameter is between about 0.2 and about 0.5.

In another embodiment according to any of the previous embodiments, an A-flange mounts the nacelle to extend outwardly and the trench being formed outward of an outermost end of the A-flange.

In another embodiment according to any of the previous embodiments, the trench is formed at a location that will be substantially bottom dead center when the gas turbine engine is mounted on an aircraft.

In another embodiment according to any of the previous embodiments, the forward end of the nacelle extends outwardly for varying extents across a circumference of the nacelle, and the ratio of the distance to the outer diameter for all locations of the nacelle being between about 0.2 and about 0.45.

In another embodiment according to any of the previous embodiments, the trench is non-parallel to a centerline of the gas turbine engine.

In another embodiment according to any of the previous embodiments, the trench has an outer end and an inner end, and the inner end being angled relative to the outer end in a direction of rotation of the fan blade.

In another embodiment according to any of the previous embodiments, an acoustic treatment is placed in the trench.

In another embodiment according to any of the previous embodiments, an A-flange mounts the nacelle to extend outwardly and the trench being formed outward of an outermost end of the A-flange.

In another embodiment according to any of the previous embodiments, the trench is formed at a location that will be substantially bottom dead center when the gas turbine engine is mounted on an aircraft.

In another embodiment according to any of the previous embodiments, the trench is non-parallel to a centerline of the gas turbine engine.

In another embodiment according to any of the previous embodiments, the trench is formed at a location that will be substantially bottom dead center when the gas turbine engine is mounted on an aircraft.

In another embodiment according to any of the previous embodiments, the trench has an outer end and an inner end, and the inner end being angled relative to the outer end in a direction of rotation of the fan blade.

In another embodiment according to any of the previous embodiments, an acoustic treatment is placed in the trench.

In another embodiment according to any of the previous embodiments, the trench is formed at a location that will be substantially bottom dead center when the gas turbine engine is mounted on an aircraft.

In another embodiment according to any of the previous embodiments, the acoustic treatment includes a honeycomb material.

In another embodiment according to any of the previous embodiments, a fan drive turbine driving the fan rotor through a gear reduction.

In another embodiment according to any of the previous embodiments, a gear ratio of the gear reduction being greater than about 2.3.

In another embodiment according to any of the previous embodiments, a pressure ratio across the fan drive turbine being greater than about 5.

In another embodiment according to any of the previous embodiments, the fan rotor delivers air into a bypass duct as bypass air, and into a core engine including a compressor, and a bypass ratio being defined as the volume of air being delivered into the bypass duct to the volume of air delivered into the core engine, with the bypass ratio being greater than about 6.

These and other features may be best understood from the following drawings and specification.

BRIEF DESCRIPTION OF THE DRAWINGS

FIG. 2 shows a challenge in short inlet engines.

FIG. 3A shows a first embodiment.

FIG. 3B is a view along line B-B of FIG. 3A.

FIG. 4 shows another embodiment.

FIG. 5 shows yet another embodiment.

FIG. 6 shows yet another embodiment.

FIG. 7 schematically shows a feature of yet another embodiment.

DETAILED DESCRIPTION

Figure 1:
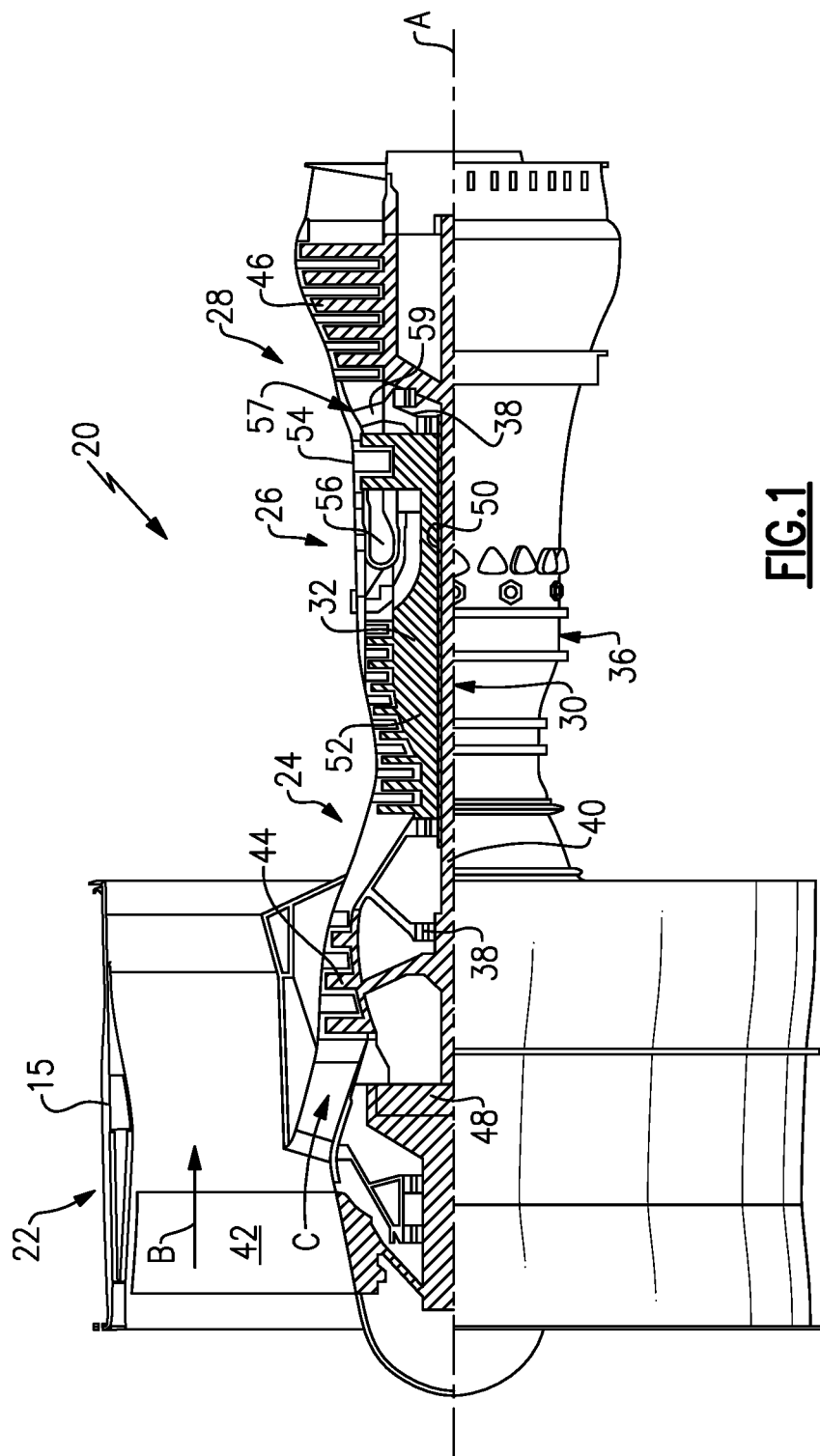
FIG. 1 schematically shows an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

FIG. 2 shows an engine known as a short inlet engine. As shown, a nacelle 94 has forwardmost ends 96 and 97. As can be seen, the forwardmost end portions do not necessarily lie in a common plane perpendicular to a center axis of the engine. Rather, point 96 is further forward than point 97. Fan blades 98 have an outer diameter 99. The nacelle 94 is shown to have a radially inwardly extending innermost point 104. Point 104 is inward of the outer diameter 99 of the fan blade 98. As shown schematically, the fan blades 98 have a root section 101 received in a hub 103 of the fan rotor. Due to the radially innermost point 104, and the mounting of the blade, it could be difficult to remove a fan blade 98 from the engine. As can be seen in FIG. 2, the nacelle at the area associated with end area 96 does not receive a trench 110, to be described below. Rather, the trench 110 is associated with an end area 97 which does not extend as far forward as end point 96.

The short inlet may be defined by a distance L measured from: (a) a plane X perpendicular to a central axis C, which plane also being tangent to a leading edge or forwardmost point 102 of the fan blade 98 to (b) a plane defined by the forwardmost points (including ends 96, 97) of the nacelle 94. A ratio is defined of L:D with D being the outer diameter of the fan blade 98.

In one embodiment L:D is between about 0.2 and about 0.45. Alternatively, the ratio may be greater than about 0.25 and in alternative embodiments greater than about 0.30. In embodiments, the ratio of L:D may be less than about 0.40.

As can be appreciated, the L:D quantity would be different if measured to the forwardmost point 96 than to the forwardmost point 97. However, in embodiments the ratio at the forwardmost point 96 would still be less than about 0.45, and the ratio at the shortest point 97 would still be greater than about 0.2.

Stated another way, the forwardmost end of said nacelle extends outwardly for varying extents across the circumference of the nacelle, and the ratio of the L:D for all portions of the varying distance of the nacelle being between about 0.2 and about 0.45.

FIG. 3A shows an engine embodiment 106 wherein a trench 110 is formed in a nacelle 108 at its inner periphery 109. In one embodiment, the trench 110 is formed at the 6 o'clock or bottom dead center position relative to the orientation that the engine 106 will face when mounted on an aircraft. Of course, the location may be a bit removed but is substantially (+/−10°) at bottom dead center. As can be appreciated from FIG. 3B, due to the trench 110, the fan blade 98 has clearance for removal from its fan rotor.

Stated another way, a fan rotor 103 has fan blades 98 received within an outer nacelle 94, and the outer nacelle has an inner surface 104. At least a portion of the nacelle inner surface extends radially inwardly to be radially inward of an outer diameter 99 of the fan blades. The inner surface of the nacelle is formed with a trench 110, which extends into the inner surface to a radially outer extent that is spaced radially outward of the outer diameter of the fan blade.

FIG. 4 shows another embodiment 120 wherein A-flange 122 is secured to the nacelle 125 by bolts 130. The A-flange is a known component and mounts the housing structure outward of the A-flange. The nacelle 125 is provided with a trench 126 and the A-flange 122 is not. As shown, the A-flange 122 would typically end at a point either aligned with the leading edge 124 of the fan blade 98 or spaced even further into the engine. For various reasons, it is desirable that the A-flange not be formed with the trench 126.

FIG. 5 shows another alternative 131. In engine 131, the nacelle 132 is formed with a trench 133. As shown, an innermost end 136 is angled relative to a center line C from an outermost end 136. The trench 133 is angled in a direction of rotation R of the fan blade 98. As known, the air approaching the fan blade 98 will tend to begin moving in the direction of rotation of the fan, and the trench 133 being angled may facilitate the flow of the air.

FIG. 6 shows yet another embodiment 140. In embodiment 140, a nacelle 142 is formed with a trench 144 as in the above embodiments. However, the trench is filled with an acoustic treatment 145. As shown, the treatment 145 includes a central honeycomb portion 146 that is sandwiched between perforated outer layers 148 and 150.

The several embodiments provide the benefits of the short inlet and allow freedom of design of the inner periphery of the nacelle, while still facilitating removal of the fan blade.

As shown in FIG. 7, the trench 168 facilitates removal of a blade 162 from a hub 160. A nacelle 164 is shown closely surrounding the blade 162. An inner surface 166 begins to move inwardly such that it would prevent removal of the blade 162 from the hub 160. However, if the blade 162 to be removed is aligned with the trench 168, it can move to the position shown in phantom at 170 where it has moved outwardly of the hub 160. At this point, it can be moved radially inwardly such that the remainder of the inner periphery 166 does not present an obstacle for removal.

As is clear from the drawings, and the statement that the blade to be removed is aligned with the trench, the trenches extend over a limited circumferential distance which is less than 360° about the centerline of the engine. In addition, the trench allows the blade to move past the inner surface point 104 that is radially inward from the outer diameter of the fan blade 98. Further, as is clear, the point 104 is between an inlet to the engine and the fan blade 98, and more particularly between the forwardmost point 96/97 and the blades 98.

Although various embodiments of this invention have been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
    a fan rotor having fan blades received within an outer nacelle, and said outer nacelle having an inner surface, and at least a portion of said nacelle inner surface extending radially inwardly to be radially inward of an outer diameter of said fan blades, and said inner surface of said nacelle being formed with a trench, said trench extending into said inner surface to a radially outer extent that is spaced radially outward of the outer diameter of said fan blades, and said fan blades being aligned with said trench and then moved through said trench, past said portion of said nacelle inner surface, and outwardly of said outer nacelle;
    wherein a distance is defined from a plane defined by leading edges of said fan blades to an axial location of a forwardmost end of said nacelle, and a ratio of said distance to said outer diameter is between about 0.2 and about 0.5;
    wherein an A-flange mounts said nacelle to extend outwardly and said trench being formed outward of an outermost end of said A-flange;
    wherein said trench is formed at a location that will be within +/−10° of bottom dead center when said gas turbine engine is mounted on an aircraft;
    wherein said forwardmost end of said nacelle extends outwardly for varying extents across a circumference of said nacelle, and said ratio of said distance to the outer diameter for all locations of said nacelle being between about 0.2 and about 0.45 and there being a forwardmost end point that extends outwardly for a greater extent than a second end point;
    wherein a fan drive turbine driving said fan rotor through a gear reduction; and
    wherein said trench extends for a limited circumferential extent that is less than 360°, and said trench being aligned with said second end point.

2. The gas turbine engine as set forth in claim 1, wherein said trench is non-parallel to a centerline of said gas turbine engine.

3. The gas turbine engine as set forth in claim 2, wherein said trench has an outer end and an inner end, and said inner end being angled relative to said outer end in a direction of rotation of said fan blade.

4. The gas turbine engine as set forth in claim 1, wherein an acoustic treatment is placed in said trench.

5. The gas turbine engine as set forth in claim 4, wherein said acoustic treatment includes a honeycomb material.

6. The gas turbine engine as set forth in claim 1, wherein said at least a portion of said nacelle inner surface is between said fan blades and said forwardmost end.

* * * * *